Aug. 12, 1969   M. G. COMBES ET AL   3,460,224
VALVE BONNET CONSTRUCTION METHOD
Filed June 30, 1967   3 Sheets-Sheet 2
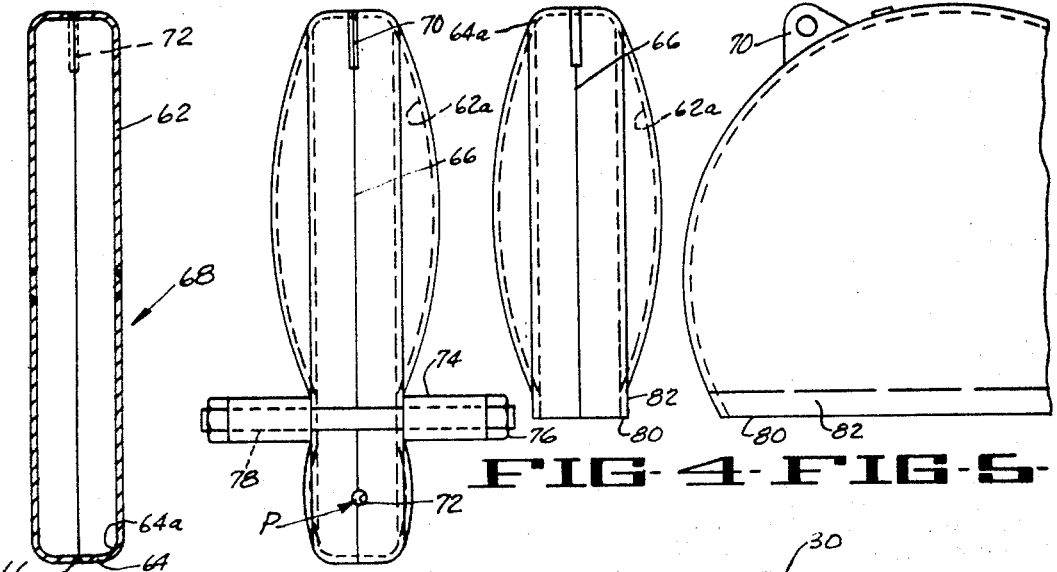
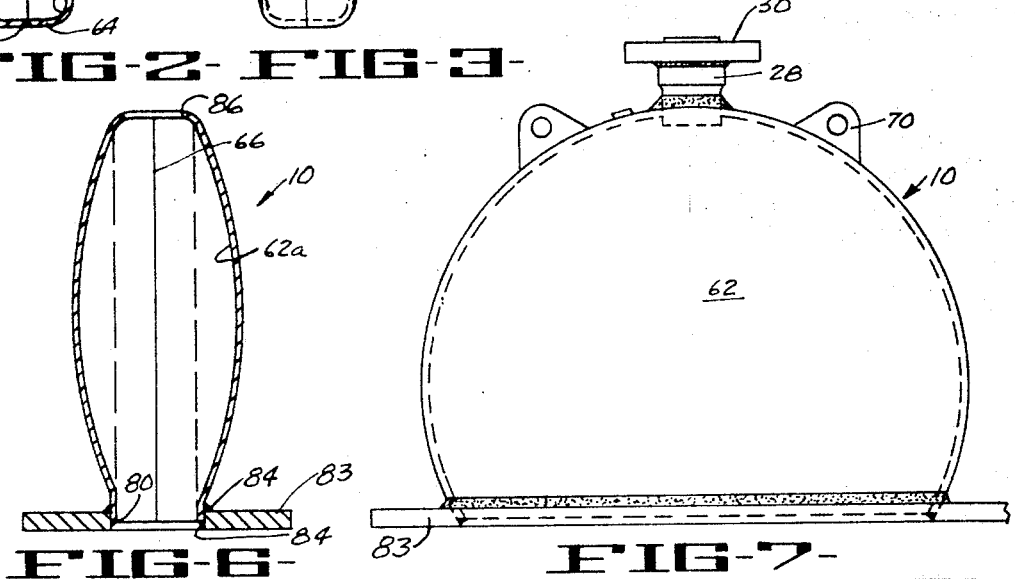
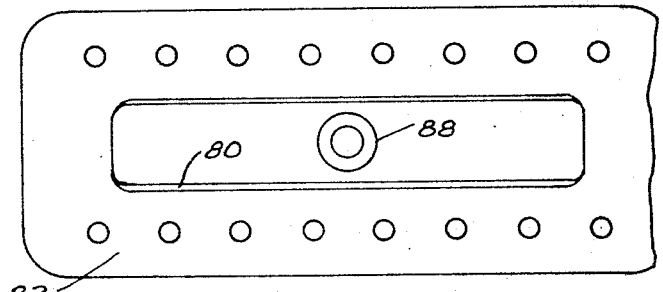
INVENTORS
HAROLD T. RAY
BY MARVIN G. COMBES
Gregg & Stidham
ATTORNEYS Aug. 12, 1969    M. G. COMBES ET AL    3,460,224
VALVE BONNET CONSTRUCTION METHOD
Filed June 30, 1967    3 Sheets-Sheet 3

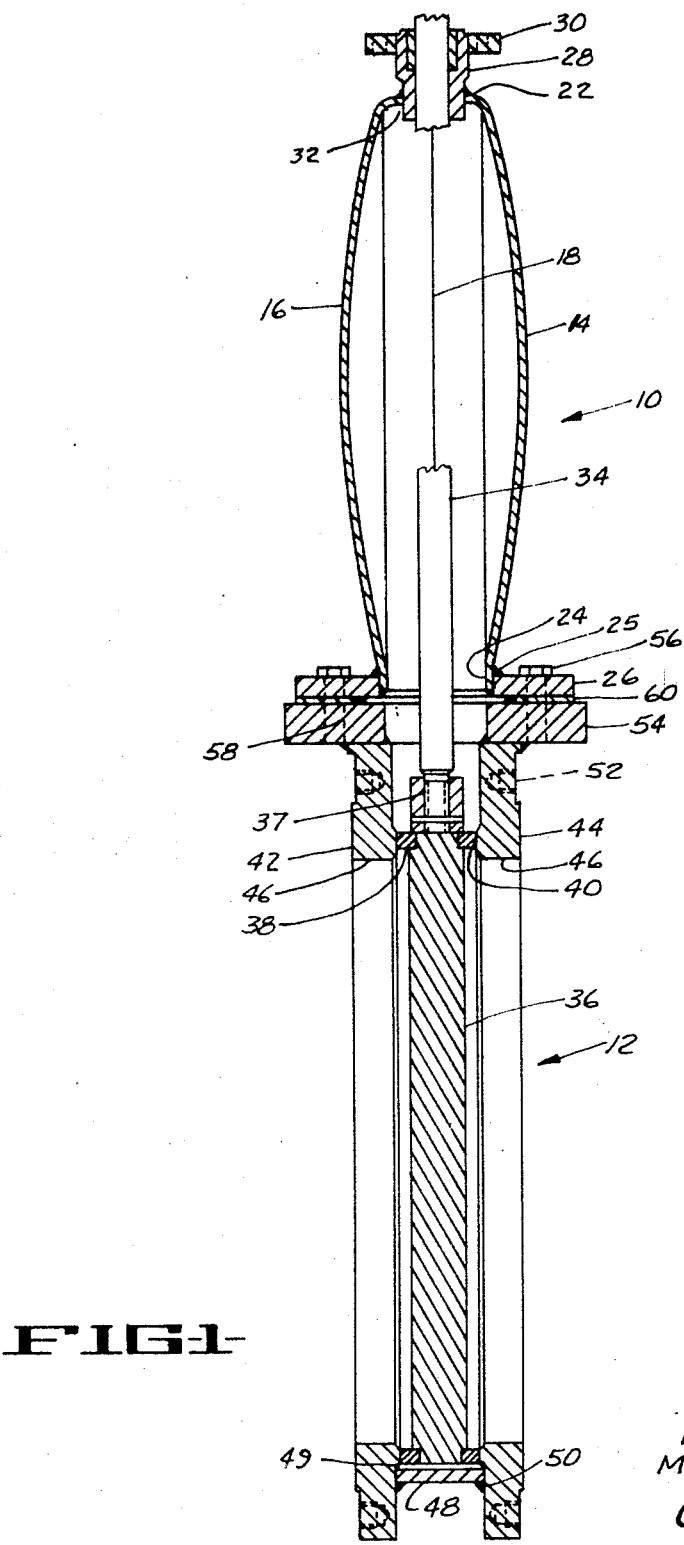

INVENTORS
HAROLD T. RAY
MARVIN G. COMBES
BY
Gregg & Stidham
ATTORNEYS 3,460,224
VALVE BONNET CONSTRUCTION METHOD
Marvin G. Combes, Castro Valley, and Harold T. Ray, Oakland, Calif., assignors to Grove Valve and Regulator Company, Oakland, Calif., a corporation of California
Filed June 30, 1967, Ser. No. 650,488
Int. Cl. B23k 31/02; B21d 53/00
U.S. Cl. 29—157.1                                    1 Claim

ABSTRACT OF THE DISCLOSURE

A method of constructing a valve bonnet enclosure of relatively thin metal by welding around the annual edges of two generally circular dished members with generally cylindrical outer rims to form a fluid tight enclosure. A fluid is then introduced through an opening in the enclosure under sufficient pressure to cause the dished members to expand outward into a generally spherical surface configuration. The enclosure is cut away along a chord and a flange is welded around the opening, conditioning the bonnet for attachment to a complementary valve body section.

---

This invention relates to a valve construction method and, more particularly, to a method of fabricating a valve bonnet for use on valves in relatively low pressure service and entailing the extensive use of lightweight, relatively thin material.

Most valve body structures, whether cast or fabricated from metal plate, are generally made of relatively uniform material and with the walls of relatively uniform thickness. However, the requirements for valve body thickness are not necessarily uniform and where it is necessary to meet thickness requirements which are relatively localized in nature, a considerable waste of material can result by striving for uniformity. For example, when the connection to the pipeline is made directly to the wall of the valve, as is commonly done in the case of valves fabricated from metal plate, the wall thickness at the place of connection must be sufficient to permit the drilling and tapping of holes for bolted connection and, in addition, it must be sufficiently thick to withstand forces resulting from expansion and contraction of the pipeline. Particularly in the case of valves designed for low pressure service, portions of the valve body, e.g., the valve bonnet above the pipeline connection do not require walls of nearly the same thickness and the use of relatively thick walls in these portions may result in a substantial amount of waste metal. The extent of possible waste can be appreciated when it is considered that many gate valves or similar slide valves are designed for installation in pipelines as large as 60 inches in diameter and, since the valve body has to accommodate the gate in open position free of the flow passage, the height of the gate valve body must be more than twice the pipe diameter. Some pipelines carry fluid at relatively low pressures of, for example, 275 p.s.i. or less and it would be highly desirable to employ relatively thin gauge material in the manufacture of valves for use in such pipelines, if feasible to do so. However, in valve constructions heretofore employed, the wall thicknesses capable of withstanding the lower pressures often are not sufficiently thinner to justify stocking additional valve models for an insignificant saving in material.

It is, therefore, an object of this invention to provide a valve construction method involving the manufacture of a separate valve bonnet portion of the body made of relatively thin sheet metal plate material.

It is a further object of this invention to provide a method of manufacturing a valve bonnet of relatively thin sheet or pipe material, the strength of which is enhanced to increase resistance to internal pressures.

It is a further object of this invention to provide a method of manufacturing a valve bonnet of relatively thin material by expanding it outward under pressure.

It is a further object of this invention to form a fluid-tight enclosure by circumferential welding to seal between components and expanding it outward under fluid pressure.

It is a further object of this invention to form an enclosure to be expanded by fluid pressure by a single circumferential weld disposed so that it is displaced from zones of maximum stress.

In carrying out this invention, we provide a valve that is formed of two principal sections, a lower section of relatively thick material to provide strength and to accommodate a means for bolting the valve into a pipeline, and a valve bonnet portion of relatively thin sheet or plate material which has been expanded outwards so that the inner surfaces are concave and spherical for greatly increased strength. The spherically surfaced walls of the concave upper valve body portion are formed by providing a pair of dished circular members with protruding outer generally cylindrical rims which are welded together around their annular edges to form an enclosure. Hence, a single circumferential weld located midway of the cylindrical outer surface completes a fluid-tight enclosure. A fluid is then introduced under pressure sufficient to cause the circular faces of the dished members to expand outward. Inasmuch as the pressure of the fluid is distributed equally over the surfaces of the enclosure, the outward expansion tends to generate spherical surfaces which provide maximum resistance to internal pressure. Moreover, with the weld intermediate the corners between the cylindrical and circular surfaces, it is displaced from the area of maximum stress as the circular walls expand increasing the angles of those corners. After the enclosure is so expanded, it is severed along corresponding chords of the circular faces and the resultant opening is welded to a generally rectangular flange. In one form of the invention, the enclosure is clamped prior to expansion within rigid strength members having a rectangular opening of a size and shape corresponding to the cross-section of the enclosure along the chord at which it will be severed so that expansion is confined and prevented along that chord. Hence, the size of the opening can be controlled and the portion of the expanded body inserted into accommodating openings in the flange. In either case, the expanded valve bonnet of relatively thin material is secured to the lower body section as by bolting it to a complementary flange on the lower body section, the lower section being formed of relatively thick material adequate to accommodate the tapped holes for pipeline connection and to resist pressures resulting from expansion and contraction of the pipeline.

Other objects and advantages of this invention will become apparent from the description following when read in conjunction with the accompanying drawings wherein:

FIG. 1 is a vertical section view of a gate valve embodying features of our invention;

FIG. 2 is a vertical section of an enclosure from which the valve bonnet portion of the gate valve is formed;

FIG. 3 is an elevation view of the enclosure after being clamped and expanded;

FIGS. 4 and 5 are front and side views, respectively, of the expanded and severed enclosure;

FIG. 6 is a vertical section view of the partially completed valve bonnet with flange attached;

FIGS. 7 and 8 are front and bottom views, respectively, of the completed valve bonnet;

Figures 9, 10:
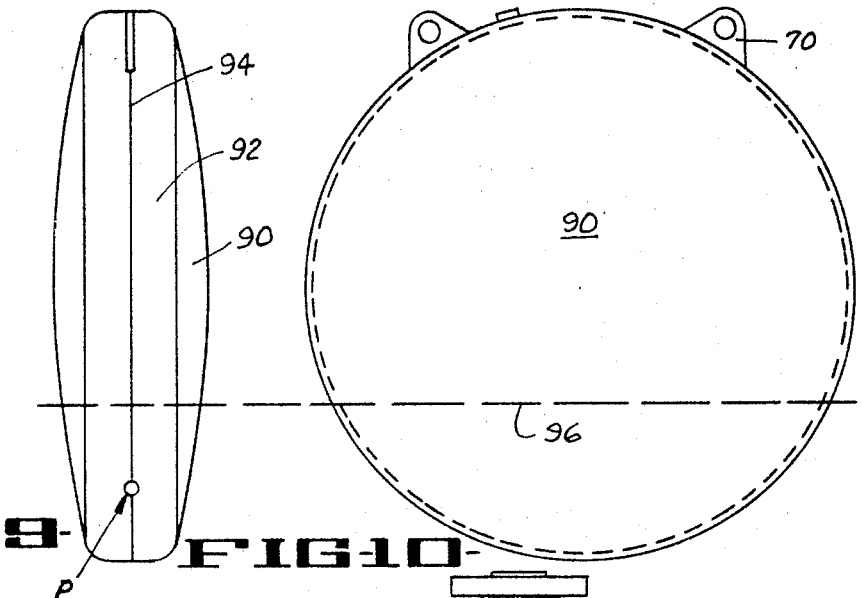
FIGS. 9 and 10 are side and front views, respectively, of a valve bonnet enclosure expanded according to another embodiment of this invention.

Referring now more particularly to FIG. 1, the valve body of this invention comprises an upper body section or bonnet 10 secured to a relatively thicker lower body section 12. The upper body section comprises a pair of opposing dished members 14 and 16 which are secured together as by welding at 18 around the peripheries of the annular edges of their opposing generally cylindrical rims 22. The circular faces 14 and 16 which form the end walls are expanded outward by a method hereinafter to be described so that the inner surfaces are spherically concave to add increased resistance to bending, particularly under internal pressures. The lower end 24 of the upper body section is of generally rectangular cross-section and is welded at 25 within a complementary flange 26.

A valve stem slide bearing 28 including a flange 30 is secured at the top of the body band 18 within an opening 32 to accommodate the valve stem 34 to which is secured a gate disc 36 as by threaded engagement at 37. The valve disc carries seat rings 38 for sealing engagement with the inner surface 40 of the lower body portion 12 when the valve disc is in its closed position shown in FIG. 1. A valve operator (not shown) may be secured to the upper flange 30 to raise and lower the valve stem and open and close the valve.

The lower body portion 12 is preferably formed of relatively thick metal end plates 42 and 44, each including fluid passage openings 46, and between the end plates 42 and 44 is secured a body band 48 which may be sealed as by welding inside and out at 49 and 50. Each of the end plates 42 and 44 must be rigid enough to resist pipeline forces without adversely affecting operation of the valve and must be thick enough to accept tapped holes 52 to attach the valve to pipeline flanges. A generally rectangular flange 54 is welded to the flat upper ends of the end plates 42 and 44 and to the body band 48.

When assembling the body sections, the complementary flanges 26 and 54 of the upper and lower body sections 10 and 12 are secured together as by means of capscrews 56, and the joint is sealed as by means of an O-ring 58 with some means, such as the thin ring 60 shown, functioning as an O-ring retainer.

FIGS. 2 through 8 disclose one method of fabricating the valve bonnet section wherein a pair of dished members 62 with generally cylindrical rims 64 are formed of relatively thin sheet or plate material and are secured together in face to face relationship, as by welding at 66 around opposing annular edges to form an enclosure 68. As used herein, the terms "sheet" and "plate" are not restricted by steel industry standards, but are intended as general terms defining a relatively thin, expandable member. In any event, eyes 70 may be secured to the enclosure 68 to facilitate handling, and a pressure fluid inlet opening 72 is bored at any suitable place in the enclosure.

Then, a pair of rigid resistance bars 74 are placed across a chord of the circular walls 62 and clamped firmly against them as by adjusting nuts 76 on the studs 78. After the enclosure is so clamped, a suitable fluid such as water is introduced through the inlet opening 72 at a pressure P sufficient to cause the circular walls 62 to expand outward throughout the areas thereof, except where expansion is prevented by the resistance bars 74. Since the fluid pressure P is distributed equally over the entire inner surface of the enclosure 62, the inner surfaces 62a tend to assume a spherical concave configuration which provides maximum strength. Then, the resistance bars are removed and the enclosure is severed at 80 along the undeformed chordal strip 82, as shown in FIGS. 3 and 4.

By using dished members with integral cylindrical rims or axial flanges 64 instead of a separate body band welded between flat sheets, bending stresses at the corners 64a where the angles spread with outer expansion of the walls 62, are in the metal of the dished members and not in the weld where failure is more likely.

Since the chordal strip is undeformed, its size in cross-section is maintained and, as shown in FIGS. 6 to 8, that cross-section is of a size and shape such that the undeformed chordal strip 82 fits within a generally rectangular opening of a relatively heavy plate flange 83 where it is secured and sealed by welding at 84 around the periphery of the opening 80. Finally, an opening 86 is cut in the top of the bonnet 10 to receive a slide bearing member 28 for the valve stem 34 (FIG. 1) and the valve bonnet is ready for assembly with the heavy lower body section 12.

Figures 11, 12:
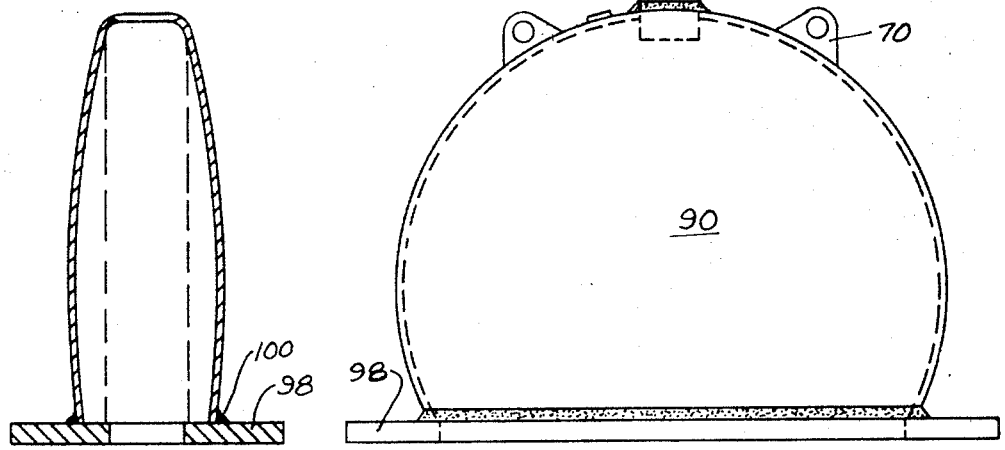
FIG. 11 is a vertical section view of the enclosure of FIG. 9 after being severed and welded to a flange.
FIGS. 12 and 13 are, respectively, front and bottom views of the completed valve bonnet enclosure.
Figure 13:
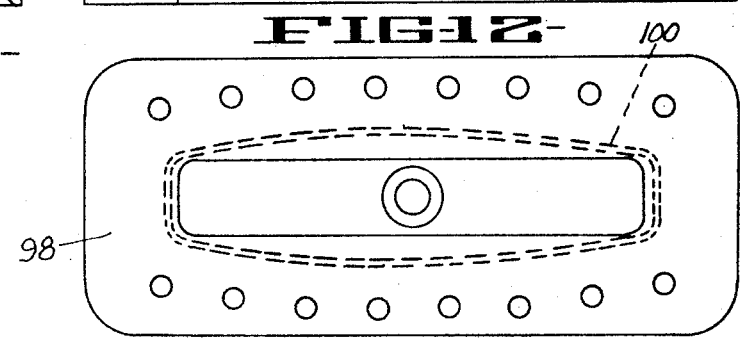

Referring now to FIGS. 9 to 13, the expansion-resisting bars 74 of FIG. 3 may be omitted and the pressure fluid introduced to cause uniform expansion over the entire areas of the enclosure walls 90 whereby each opposite wall 90 will assume a spherical configuration over its entire surface.

It should be noted that by forming the enclosure of two dished members with integral rims 92 the entire enclosure may be formed by a single weld 94 around the opposing annular edges. Again, a further advantage is realized in that as the expansion of the side walls spreads the angle between the side walls 90 and the cylindrical rims 92, the bending stress is primarily in the metal itself. After expansion, the enclosure is severed along a chordal line 96 and is then welded to the flange 98 by welding around the lower edge 100 of the strip. This embodiment does not result in a restricted cross-section as in the embodiment of FIGS. 1 to 8, but it does produce a more uniform spherical configuration over the entire area of the valve bonnet walls 50. Moreover, the configuration of the curved sheets can be calculated if desired.

While this invention has been described in connection with preferred embodiments thereof, it is obvious that modifications and changes therein may be made by those skilled in the art without departing from the spirit and scope of this invention as defined by the claim appended hereto.

Having described our invention, we claim:

1. The method of constructing a valve bonnet comprising the steps of:

selecting a pair of generally circular, dished members of thin metal of substantially uniform thickness throughout and formed with integral, generally cylindrical opposing rim portions, positioning said members with the annular edges of said rim portions in face to face relationship, welding said members together along said annular edges to form an enclosure, introducing fluid into said enclosure at sufficient pressure to cause said dished members to expand outward, cutting through said enclosure along a plane intersecting said circular members along corresponding chords thereof, and securing a flange to said enclosure by welding around the chordal opening of said enclosure, said enclosure being totally unrestrained during expansion thereof to form a spherical surface on each dished member from rim to rim, said flange has a through opening, said enclosure being placed on said flange with said chordal opening embracing said through opening, and then welding around said chordal opening to the upper surface of said flange.

References Cited
UNITED STATES PATENTS

| | | | |
|---|---|---|---|
| 2,715,377 | 8/1955 | Gary | 29—412 XR |
| 3,239,921 | 3/1966 | Grove | 29—157.1 |
| 3,386,151 | 6/1968 | Combes | 29—157.1 |

JOHN F. CAMPBELL, Primary Examiner

R. B. LAZARUS, Assistant Examiner